No. 751,715. Patented February 9, 1904.

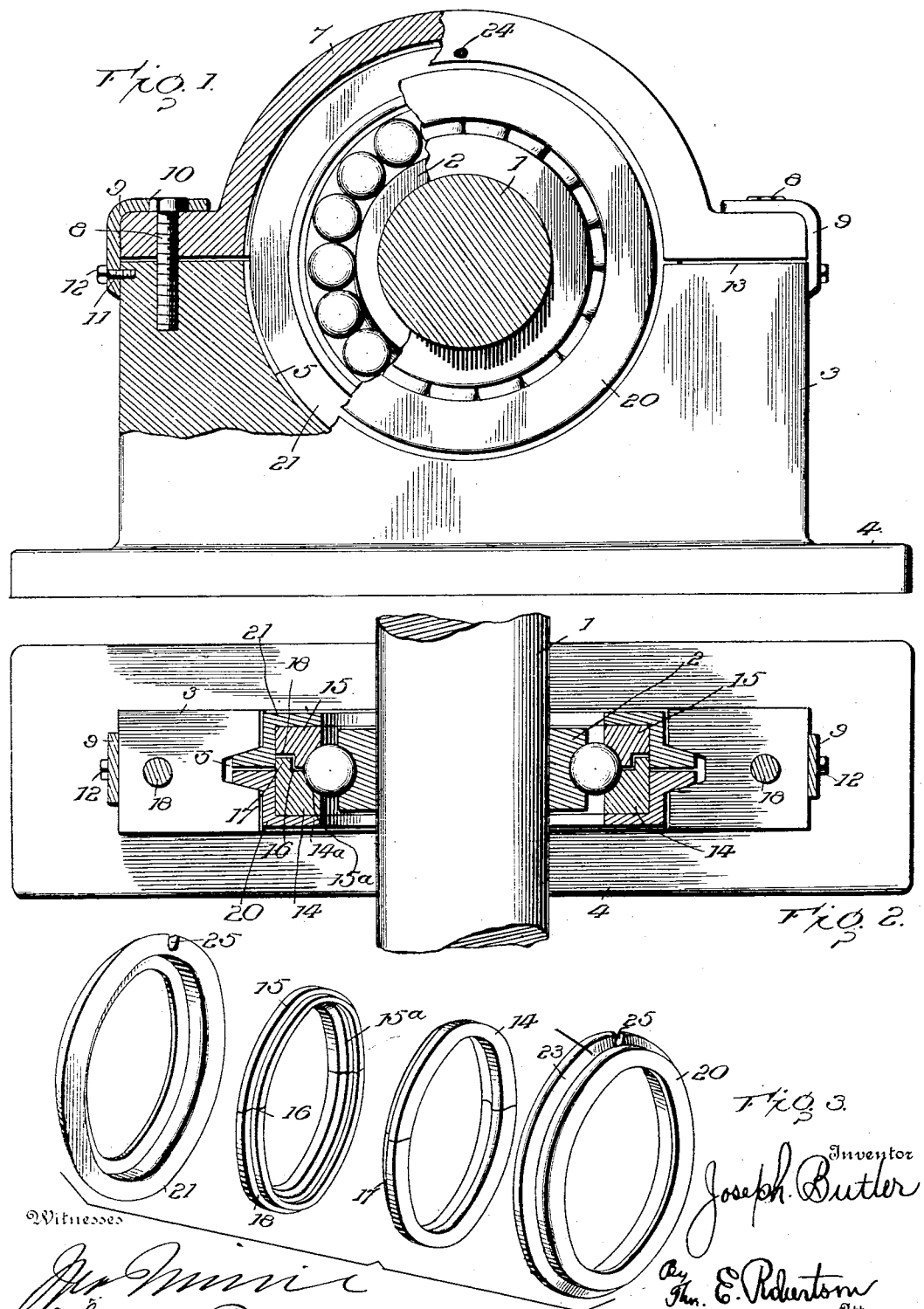

UNITED STATES PATENT OFFICE.

JOSEPH BUTLER, OF CLEVELAND, OHIO.

BEARING.

SPECIFICATION forming part of Letters Patent No. 751,715, dated February 9, 1904.

Application filed March 17, 1903. Serial No. 148,227. (No model.)

*To all whom it may concern:*

Be it known that I, JOSEPH BUTLER, a citizen of the United States of America, and a resident of Cleveland, in the county of Cuyahoga, in the State of Ohio, have invented certain new and useful Improvements in Bearings, of which the following is a specification.

This invention relates to improvements in ball-bearings intended especially for use on automobiles and similar vehicles where the bearings have to be constructed to meet certain rigid requirements caused by the arrangement of the axles; but it is of course applicable to use in many other places, as will be obvious from an inspection of my drawings.

It is the main object of my invention to provide a ball-bearing which, in addition to its ready adjustability, can have its worn parts easily replaced.

With this main object and an improved bearing generally my invention consists in the peculiar construction, arrangement, and combination of parts, as hereinafter more particularly described and then definitely claimed at the end hereof.

In the accompanying drawings, which represent the preferable embodiment of my invention, Figure 1 is a side elevation with parts in section of a bearing made in accordance with my invention. Fig. 2 is a horizontal section, and Fig. 3 is a perspective view, of the separable cone and their rings removed from the axle and without the casing.

Referring now to the details of the drawings by numerals, 1 designates the shaft, on which is secured in any desirable way a collar 2, which may be of ordinary or any preferred construction, except that it is provided with the usual ball-race, as shown in the sectional view, Fig. 2.

Fixed to some part of the frame of the vehicle or to whatever the bearing may be applied is a bottom casing 3, provided with the usual base 4, by which it may be securely bolted in position. This bearing is provided with a deep recess of the peculiar formation shown in Fig. 2 and which in reality is a deep annular V-shaped or angular recess 5. This casing 3 is adapted to have coact with it an upper casing 7, which has a recess somewhat similarly formed and which is adjustably secured to the lower half of the casing 3 by bolts 8. These bolts 8 are after being properly adjusted held in position by means of nut-locks 9, made preferably of right-angular form, each side of the angle having an opening therein, the first opening 10 being of the proper size and shape to fit over the head of the nut 8 and the other opening 11 being merely large enough to permit a bolt 12 to pass therethrough and into the casing 7, by means of which the adjusting-bolt is readily held in its adjusted position.

Within the casings 3 and 7 and surrounding the collar 2 is a removable bearing-surface or separable cone which is preferably formed of two rings 14 and 15, which in turn are each formed of two parts, the two rings each having ball-races, (indicated at $14^a$ and $15^a$.) The said rings are preferably divided on a horizontal broken line, (indicated at 16 in Fig. 3.) The ring 14, or rather the two parts forming the ring, is formed with an annular flange 17, which fits into a corresponding annular recess 18 in the ring 15, as clearly shown in Fig. 2. Surrounding the separable cone is a divided ring formed of two circular parts 20 and 21, forming between them, when they are together, a ring with a deep recess, into which fits the separable cone 14 15 and in which it is housed. This outer ring is formed with an annular wedge-shaped or tapering portion 23, which is formed to fit within the similarly-shaped recess 5 in the parts 3 and 7 of the casing, as clearly shown in Fig. 2. In order to prevent the divided ring from rotating, I insert a pin 24 through the upper part 3 of the casing, which fits in a slot 25 in the divided ring and permits any but a rotary movement of said ring.

It follows from the foregoing construction that when the parts are assembled the separable cone provides a complete ball-race which coacts with the ball-race on the collar secured to the axle, and the parts of said separable cone are securely held in place by means of the divided ring, and as the wedge-shaped portions of the latter fit within the two halves of the bearing it is easy to see that whenever the upper half of the bearing is adjusted with respect to the lower half, so as to bring the two parts of the casing somewhat closer together, the result will be that the two halves of the divided ring are also brought closer together laterally, which thereby moves the parts of the separable cone to make the corresponding adjustment on the balls. It will also be seen that my bearing is such that whenever it is necessary to replace a broken ball or to insert a new separable cone when the parts of the latter become worn all that the operator has to do is to remove the upper half of the bearing and then by slightly raising the axle out of the lower half of the bearing the two parts of the divided ring may be spread apart laterally and the parts of the separable cone removed. By making the said separable cone in four parts the separable cone can be entirely removed without removing the divided ring from the axle. This I consider important.

My bearing will be found very effective in service, especially if used in automobiles where it is necessary that the cone may be easily replaced when worn, and it will be manifest that whenever the said separable cone becomes too much worn for further service or when the bearing needs attention for other purposes the cone can be replaced by another, as just described.

Changes and modifications may be made in the form of my invention without departing from the spirit thereof, and I therefore intend the following claims to cover all such changes as naturally fall within the lines of my invention. For instance, my invention would be operative if the separable cone were made of two rings, but would not of course fulfil all the purposes for which I have designed the four-part cone.

What I claim as new is—

1. In a bearing, a suitable casing, an axle, collar and balls, in combination with a separable cone interposed between said casing and said axle; the said cone being divided radially and also at right angles to its axis; and means for holding said separable cone in position; substantially as described.

2. In a bearing; a suitable casing, an axle; collar and balls, in combination with a separable cone interposed between said casing and said axle; a ring surrounding said separable cone and arranged to hold the same in position; said ring and said casing having an angular annular portion and a similarly-shaped recess; substantially as described.

3. In a bearing; a suitable casing, an axle; collar and balls, in combination with a separable cone interposed between said casing and said axle; a divided ring coacting with said separable cone and arranged to hold the same in position, said ring having an angular annular portion fitting within a similarly-shaped recess in the casing, whereby said separable cone may be adjusted; substantially as described.

4. In a bearing; a suitable casing, an axle; collar and balls, in combination with a separable cone interposed between said casing and its axle; said cone being divided both radially and at right angles to its casing; and a divided ring for holding said divisions in place, said ring having an angular portion fitting within a similarly-shaped recess in the casing; substantially as described.

5. In a bearing; a suitable casing, an axle; collar and balls, in combination with a separable cone interposed between said casing and the axle; a divided ring; each portion of the ring having a flange coacting with the separable cone and an angular portion fitting within a similarly-shaped recess in the casing; substantially as described.

6. In a bearing; a suitable casing, an axle; collar and balls, in combination with a separable cone interposed between said casing and said axle; said cone being divided both radially and at right angles to its axis; and a divided ring, said ring having flanges projecting over and holding said separable cone in position and angular portions fitting within similarly-shaped recesses in said casing; substantially as described.

Signed by me this 11th day of March, 1903.

JOSEPH BUTLER.

Witnesses:
J. F. MOORE,
WALTER MCMAHON.